United States Patent
Wu et al.

(10) Patent No.: US 7,940,019 B2
(45) Date of Patent: May 10, 2011

(54) CONTROL MODULE ADAPTED TO BRUSH AND BRUSHLESS MOTORS

(75) Inventors: Shing-Jung Wu, Kaohsiung County (TW); Kuei-Hsing Liu, Kaohsiung (TW)

(73) Assignee: STL Technology Co., Ltd., Kaohsiung (TW)

( * ) Notice: Subject to any disclaimer, the term of this patent is extended or adjusted under 35 U.S.C. 154(b) by 294 days.

(21) Appl. No.: 12/338,114

(22) Filed: Dec. 18, 2008

(65) Prior Publication Data

US 2010/0148709 A1 Jun. 17, 2010

(51) Int. Cl.
*H02P 6/16* (2006.01)

(52) U.S. Cl. ......... 318/400.04; 318/400.07; 318/400.26; 318/400.38

(58) Field of Classification Search ............ 318/400.01, 318/400.04, 400.07, 400.17, 400.2, 400.26, 318/400.38, 722, 599
See application file for complete search history.

(56) References Cited

U.S. PATENT DOCUMENTS

| 5,319,291 | A | * | 6/1994 | Ramirez | 318/400.25 |
| 6,091,216 | A | * | 7/2000 | Takahashi et al. | 318/400.09 |
| 6,924,611 | B1 | * | 8/2005 | Tzeng et al. | 318/400.17 |
| 7,764,032 | B2 | * | 7/2010 | Crabill et al. | 318/400.1 |
| 7,830,104 | B2 | * | 11/2010 | Takeuchi | 318/400.01 |
| 7,834,565 | B2 | * | 11/2010 | Armstrong | 318/254.1 |

* cited by examiner

*Primary Examiner* — Bentsu Ro
*Assistant Examiner* — Thai Dinh
(74) *Attorney, Agent, or Firm* — Rosenberg, Klein & Lee

(57) ABSTRACT

A control module adapted to brush and brushless motors essentially applies a magnetic sensor to generate detecting signals in response to the status of the motor and deliver those signals to a control unit. The control unit further converts the signals into discrete diverting signals for driving the rotating direction, phase commands for controlling the motor phase, and a pulse width modulation (PWM) for adjusting the motor speed. A phase refining circuit thence receives those transformed signals and confirms merely a selected phase command attendant with the diverting and PWM signals for assisting a stable operation of the motor. Therefore, such control module not only applies to different types of motors but uses the separate transmissions of the signals responsible for designated instructions to attain facile controls and appropriate adjustments to the errors of the motor phase or motor velocity and efficiently decrease the occurrence of breaking the motor.

1 Claim, 3 Drawing Sheets

CONTROL MODULE ADAPTED TO BRUSH AND BRUSHLESS MOTORS

BACKGROUND OF THE INVENTION

1. Field of the Invention

The present invention relates to a control module, in particularly to a control module adapted to both brush and brushless motors.

2. Description of the Related Art

Generally, sorts of motors having wide applications are mainly categorized by brush and brushless motors in view of their interior configurations. Wherein, the control module adapted to the brush motor (not shown) simply makes use of an input current and a signal to control the motor rotating clockwise or counterclockwise in a certain velocity.

In contrast to the brush motor, a control module adapted to the brushless motor needs complicate executions due to the existence of phases. Referring to FIG. 1, for the application of conventional control module 1 on to the brushless motor 2 with 3-phase circuits U,V,W, it essentially provides a magnetic sensor 11 for sensing the rotated variations of the rotor in the brushless motor 2 and for transmitting detecting signals HU,HV,HW, a control chip 12 receiving and directly outputting those detecting signals, an arranging circuit 13 serving to transform the detecting signals into matching commands, and a driving circuit 14 driven in response to the transmission of the selected matching command. Wherein, the arranging circuit 13 converts the detecting signals from the control chip 12 into six-step square wave signals/commands UH,UL,VH,VL,WH,WL; the driving circuit 14 receives the sequencing of the wave signals to trigger the operation of the brushless motor 2.

Accordingly, the magnetic sensor 11 initially senses and confirms the rotating magnetic field U,V,W where the rotor of the motor 2 is located and then creates three detecting signals HU,HV,HW integrally controlling the motor phase, directions, and speed. Those signals passing through the control chip 12 is thence sent to the arranging circuit 13 by which they would be transacted into the six-step square wave signals UH,UL,VH,VL,WH,WL. The driving circuit 14 follows the alternations of those wave signals to generate dynamic forces for rotating the brushless motor 2 in a certain speed.

From above, the control module 1 applied to the brushless motor 2 mainly utilizes the direct transmission of the detecting signals HU,HV,HW from the control chip 12 toward the allocating circuit 13 in order to trigger the rotation of the motor by driving circuit 14 in response to the alternating wave signals. However, such control chip 2 may not only cause the problem of irregularly transmitting the detecting signals HU,HV,HW but facilely renders the promiscuous or multiple signals simultaneously sent to the driving circuit 14. Then, the conflict between the transmitted signals would further cease or make the abnormal rotation of the motor, and even destroy the motor.

In addition, due to the straight deliveries of those integral detecting signals HU,HV,HW, the control module 1 has great difficulty in instantly distinguishing the errors on the motor speed or the phase control and results of the inefficient managements and adjustments.

Of further disadvantage, it is typical to use respective control modules to fit with the brush and the brushless motors, so the application of the conventional control module 1 is restricted that it can merely used for the brushless motor. Therefore, the prior control module incurs inconveniences.

SUMMARY OF THE INVENTION

The object of the present invention is to provide a control module adapted to brush and brushless motors that respective manages phase commands, the PWM, and the diverting signals, whereby the present module facilitates to attain instant detections and adjustments to the discrete errors, easily control the motor(s), and decrease the destruction of the motor(s).

The control module in accordance with the present invention essentially includes a magnetic sensor detecting the motor rotating changes and transmitting detecting signals, a control unit receiving the detecting signals and outputting independent signals, a phase refining circuit receiving those signals from the control unit, an allocating circuit accepting those selected signals from the phase refining circuit, and a driving circuit receiving wave signals from the allocating circuit and triggering the rotation of the motor. Wherein, the control unit mainly assists in transmitting isolated signals so that diverting signals for determining motor directions, phase commands for controlling the motor phase, and a pulse width modulation (PWM) signal for determining a rotation speed are received by the phase refining circuit. Thence, the phase refining circuit not only allows the diverting signals and the PWM but strictly permits merely one of the phase commands to be simultaneously transmitted to the subsequent circuits. Accordingly, by means of the present module mainly applying the separate transmissions of those signals and commands dedicated to respective works, the driving circuit can dominate the rotation of the motor with stability and smoothness. While scanning, the present module can facilely distinguish the errors between the motor phase and the motor speed and make adjustments, so as to attain a preferable controlling effect and efficiently prevent from damaging the motor. Furthermore, the present module has multiple applications on both the brush and brushless motors and thence increases conveniences of using.

The advantages of the present invention over the known prior arts will become more apparent to those of ordinary skilled in the art by reading the following descriptions with the relating drawings.

DETAILED DESCRIPTION OF THE PREFERRED EMBODIMENTS

Figure 1:
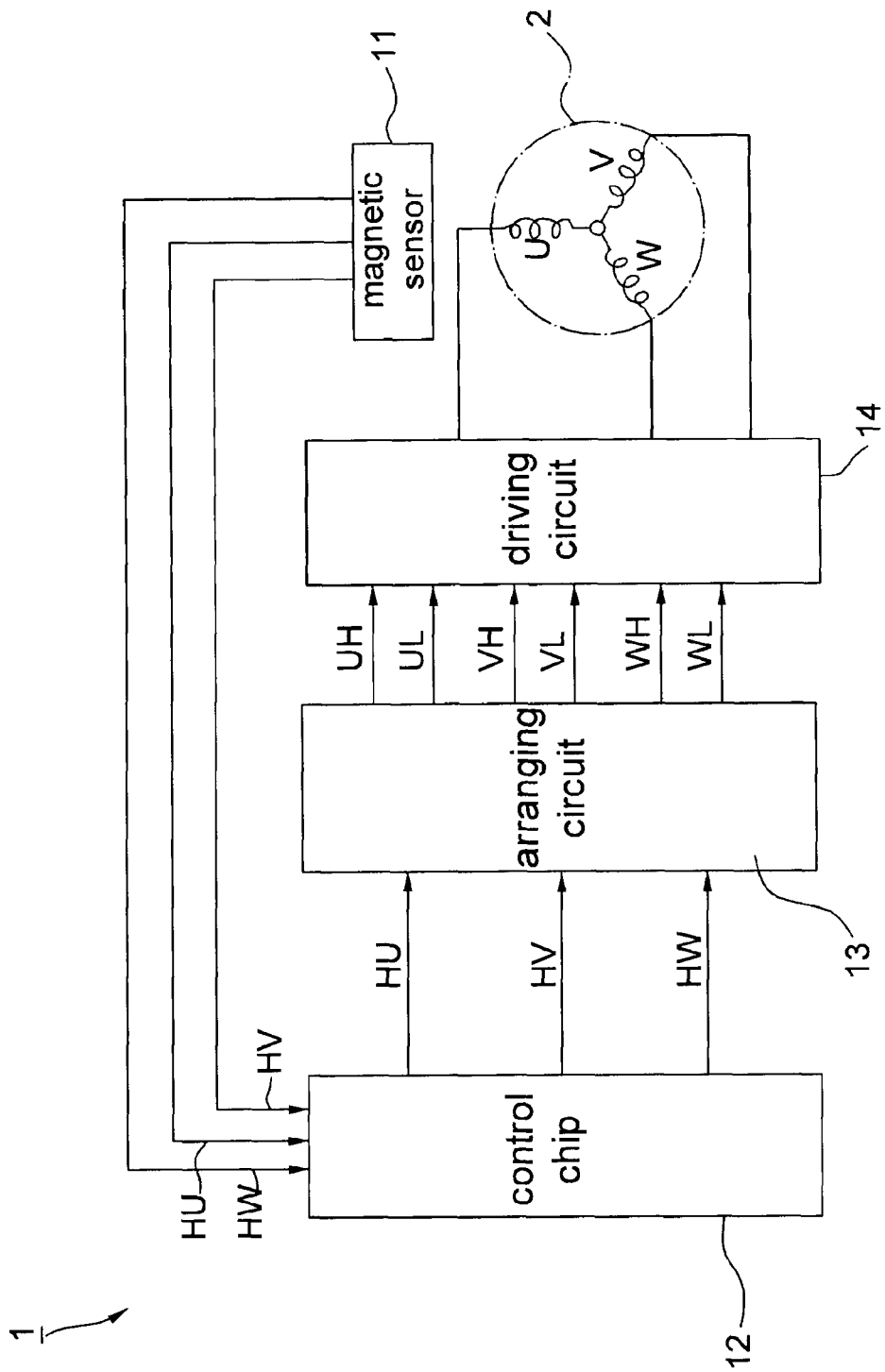
FIG. 1 is a schematic view showing a diagram of a conventional invention.

Before describing in greater detail, it should note that the like elements are denoted by the similar reference numerals throughout the disclosure.

Figure 2:
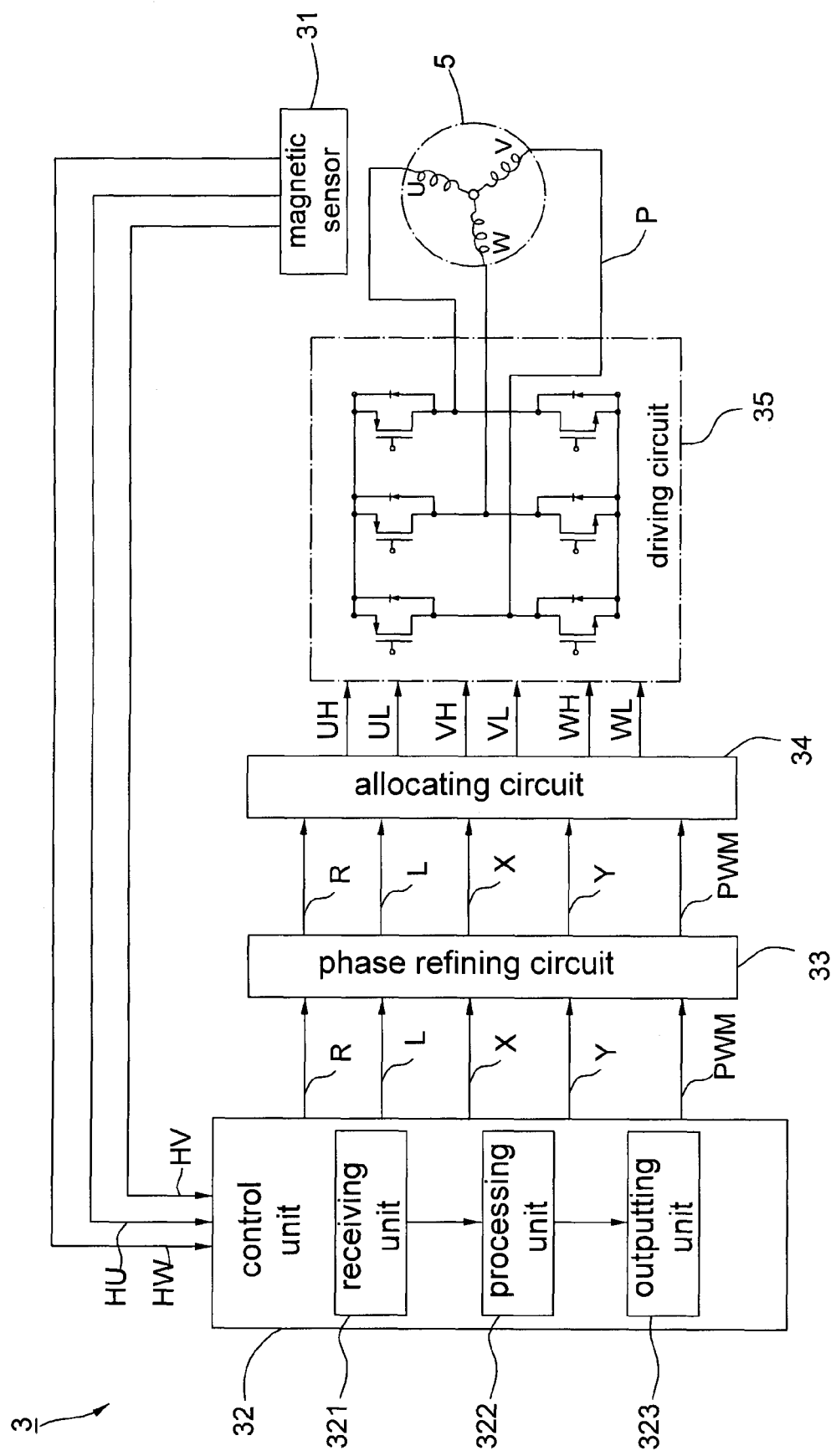
FIG. 2 is a schematic view showing a diagram of a first preferred embodiment of the present invention applied to a brushless motor.

Referring to FIG. 2 shows a first preferred embodiment of the present invention, a control module 3 adapted to a brushless motor 5 with three phase system U, V, W mainly comprises a magnetic sensor 31 for transmitting detecting signals HV,HU,HW in response to the rotating situation of the motor 5, a control unit 32 receiving and converting the detecting signals HV,HU,HW, a phase refining circuit 33 accepting the separate signals output sent by the control unit 32, an allocating circuit 34 obtaining the transmission from the phase refining circuit 33, and a driving circuit 35 connecting with the allocating circuit 34 for trigger the manipulation of the motor 5. Wherein, the magnetic sensor 31, the allocating circuit 34, and the driving circuit 35 of this preferred embodiment all have the same concatenation of the elements and same functions as those of the conventional control module 1 which cooperates with the brushless motor, and herein are omitted.

Further, the control unit 32 includes a receiving unit 321 for receiving the detecting signals HV,HU,HW, a processing unit 322 connected with the receiving unit 321 for switching the received detecting signals HV,HU,HW, and an output unit 322 for outputting the switched detecting signals; wherein, those switched detecting signals contain a first and a second diverting signals R,L for determining rotating directions (i.e. obverse or reverse) of the motor 5, a first and a second phase commands X,Y for controlling the phase of the motor 5, and a pulse width modulation signal PWM for determining the motor speed. The phase refining circuit 33 serves to direct receive the diverting signals R,L and the PWM signal and further strictly selects merely one phase command X or Y in conformity with the status of those signals R,L,PWM, so that the selected phase command can pass toward the allocating circuit 34 along with the signals R,L,PWM and thence go to the driving circuit 35.

While the brushless motor operates, the magnetic sensor 31 initially detects at which magnetic scope among V,U,W the rotor (not shown) of brushless motor 5 is located and accordingly generates three detecting signals HV,HU,HW. While those detecting signals HV,HU,HW are sent and received by the control unit 32, the processing unit 322 would first obviate the repetition of the inputted detecting signals HV,HU,HW and applies the output unit 323 to deliver the separate diverting signals R,L for dominating the obverse and reverse rotations, the PWM signal which can adjust the rotation speed, and either the processed phase commands X or Y that could create four pairs of phase messages XX,XY,YX,YY sufficiently to transact the variations of the phase of the motor 5.

Still further, not only the signals R,L,PWM but the phase messages may be transmitted to the phase refining circuit 33. In this manner, the phase refining circuit 33 would determine merely one phase message attendant the signals R,L,PWM to be sent to the allocating circuit 34, which thence serves to convert the signals and message into the six-step square wave signals UH,UL,VH,VL,WH,WL and deliver them to the driving circuit 35, so that the driving circuit 35 could create a running signal P to smoothly and steadily rotate the motor 5. Therefore, the divisions of the diverting signals R,L, the phase commands X,Y, and the PWM signal dedicated to their indicated controls facilitate to streamline the controlling procedures and achieve easy detections and adjustments to the errors of the motor phase or speed, so as to efficiently avoid breaking the motor 5.

Figure 3:
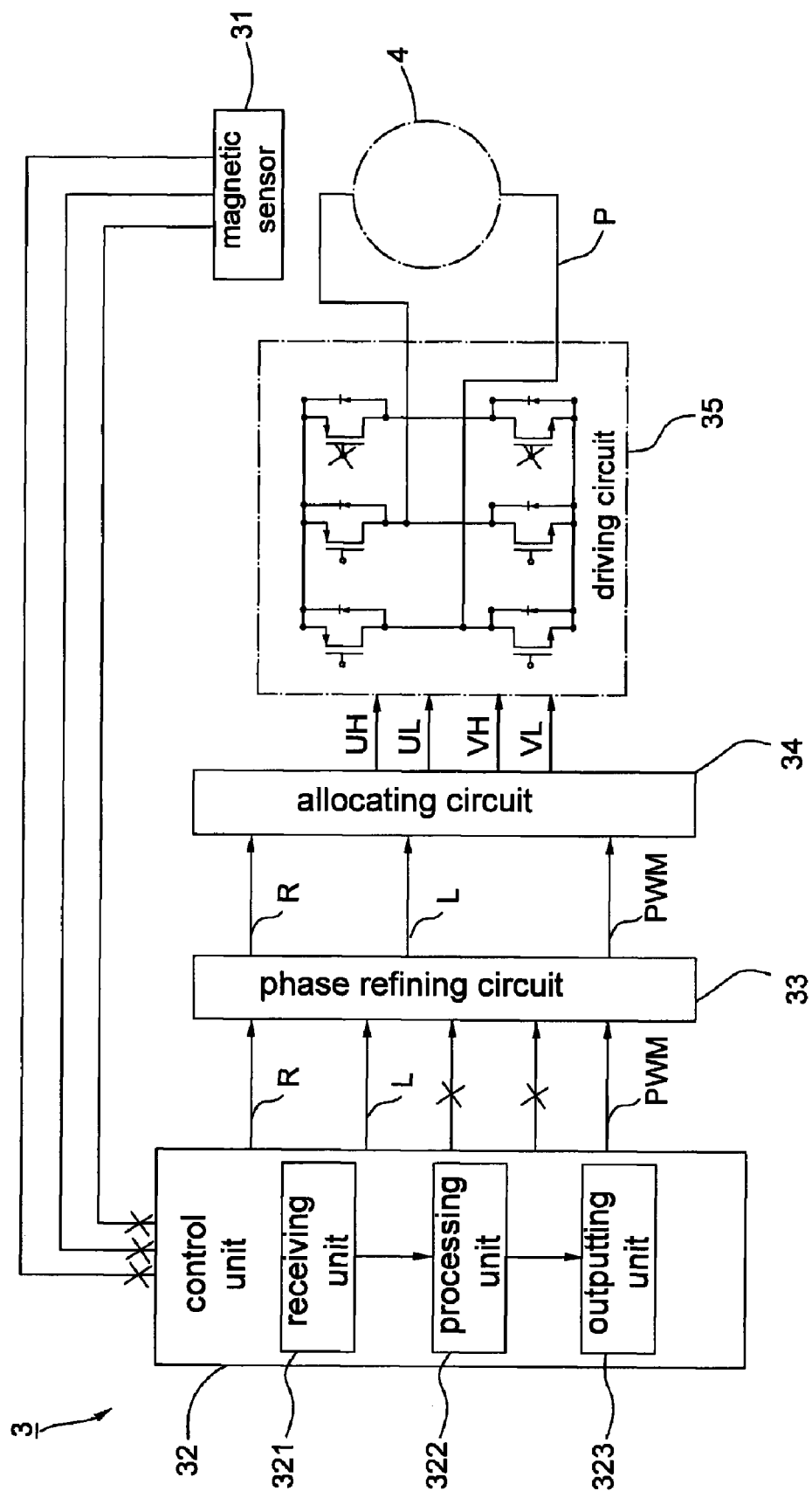
FIG. 3 is a schematic view showing a diagram of a second preferred embodiment of the present invention applied to a brush motor.

Referring to FIG. 3 shows a second preferred embodiment of the present invention, a control module 3 is allowed to be adapted to a brush motor 4. The concatenations of the interrelated elements of the control module 3 in this embodiment are as the same as the previous embodiment, except that the brush motor 4 has direct transmissions of the discrete signals from the control unit 32 to the following circuits 33,34,35 in sequence as it needs not the application of the phase system. In this manner, the receiving unit 321 would not receive the detecting signals from the magnetic sensor 31 and the processing unit 322 would not transact those signals as well. Instead, the processing unit 322 is simple in the sense that merely serves to transmit the diverting signals R,L and the PWM signal to respective control the motor directions and velocity, whereby the allocating circuit 34 would accordingly arrange six-step square wave signals UH,UL,VH,VL to be delivered to the driving circuit 35 where a running signal P would produced to actuate the brush motor 4. Therefore, the present control module 3 can also be adapted to control the brush motor 4 without transmitting discrete phase commands X,Y, hence increasing the using convenience.

Therefore, the present invention includes following advantages:
1. The control module has the control unit to convert the detecting signals into the discrete PWM and diverting signals for respectively determining the motor directions and speed. It also renders the sole phase command to be accurately confirmed by the phase refining circuit, so as to steadily drive the motor, forbid the occurrence of the multiple phase messages existing in the driving circuit, and prevent from damaging the brushless motor.
2. The separate transmissions of the signals for executing separate jobs facilitate the control module to search the faults inside lines dedicated to the diverting signals, the PWM signal, and the phase commands, thereby increasing the detecting and adjusting capability of the module.
3. The way that the control unit serves to send respective signals and commands permits the control module to be adapted to both the brush and the brushless motors, thereby far more enhancing the value of the present module.

To sum up, the present invention takes advantage of the independent transmissions of the diverting signals, the phase commands, and the PWM signal conducted from the control unit, the control module can not only be applied to variety motors but comprised the character of swiftly and accurately examining and adjusting the interior errors on the motor phase or speed. Accordingly, the present invention efficiently reduces the problem of breaking the motor and attains a preferable controlling effect.

While we have shown and described the embodiment in accordance with the present invention, it should be clear to those skilled in the art that further embodiments may be made without departing from the scope of the present invention.

We claim:

1. A control module adapted to brush and brushless motors; said control module serving as a controller to either said brush or brushless motors, essentially comprising:
   a magnetic sensor disposed proximate to said motor for detecting rotating variations of said motor and transmitting detecting signals;
   a control unit including a receiving unit for receiving said detecting signals, a processing unit connected with said receiving unit for transacting and switching said received detecting signals, and an output unit for outputting said processed detecting signal; wherein, said output unit transmitting discrete a first and a second diverting signals for determining rotating directions of said motor, a first and a second phase commands for controlling a phase of said motor, and a pulse width modulation signal for controlling a rotation speed of said motor;
   a phase refining circuit receiving said diverting signals, said phase signals, and said pulse width modulation signal from said control unit; said phase refining circuit limiting merely one pair of said phase commands considerable to said diverting signals, said phase commands, and said pulse width modulation signal, so that said phase refining circuit being able to outputting said sole phase command along with said diverting signals and said pulse width modulation signal;
   an allocating circuit adopted to a microminiaturized integrated circuit serving to receive said diverting signals, said phase command, and said pulse width modulation signal sent by said phase refining circuit and converting said aforementioned signals into six-step square wave signals; and
   a driving circuit connected with said motor and said phase refining circuit for receiving said six-step square wave signals and transforming said wave signals into a running signal to drive a rotation of said motor.

* * * * *